(12) United States Patent
White

(10) Patent No.: US 6,874,239 B1
(45) Date of Patent: Apr. 5, 2005

(54) SELF-HOLDING AND SELF-LEVELING DEVICE FOR SURVEY RANGE POLE AND METHOD OF USE

(76) Inventor: Troy White, 615 E. Vicksburg Ct., Spokane, WA (US) 99208

( * ) Notice: Subject to any disclaimer, the term of this patent is extended or adjusted under 35 U.S.C. 154(b) by 0 days.

(21) Appl. No.: 10/753,160

(22) Filed: Jan. 6, 2004

(51) Int. Cl.⁷ .............................................. G01C 15/02
(52) U.S. Cl. .............................. 33/293; 33/333; 33/392; 33/404
(58) Field of Search ................... 33/293–296, 333–334, 33/370–371, 391–392, 397, 402, 404

(56) References Cited

U.S. PATENT DOCUMENTS

| | | | |
|---|---|---|---|
| 969,732 A | * | 9/1910 | Tebyrica ........................ 33/295 |
| 3,077,035 A | * | 2/1963 | Hackney ........................ 33/293 |
| 3,934,353 A | * | 1/1976 | Haines ........................... 33/262 |
| 4,192,076 A | * | 3/1980 | Hall .............................. 33/296 |
| 4,290,207 A | * | 9/1981 | Browning et al. ............. 33/295 |
| 4,356,637 A | * | 11/1982 | Hall .............................. 33/296 |
| 4,366,940 A | | 1/1983 | Vargas .......................... 248/542 |
| 4,527,339 A | * | 7/1985 | Brunson ........................ 33/293 |
| 4,803,784 A | * | 2/1989 | Miller ........................... 33/293 |
| 5,541,727 A | | 7/1996 | Rando et al. ................. 356/149 |
| 5,619,802 A | | 4/1997 | Rando et al. ................. 33/291 |
| 5,631,732 A | | 5/1997 | Schrum, Jr. ................... 356/147 |
| 5,760,748 A | | 6/1998 | Beckingham ................ 343/765 |
| 5,983,511 A | | 11/1999 | Osaragi et al. ............... 33/293 |
| 6,002,473 A | | 12/1999 | West ............................. 356/153 |
| 6,023,326 A | | 2/2000 | Katayama et al. ......... 356/141.3 |
| 6,067,046 A | | 5/2000 | Nichols .................... 342/357.14 |
| 6,345,794 B1 | | 2/2002 | Varner ....................... 248/230.1 |

* cited by examiner

*Primary Examiner*—Christopher W. Fulton
*Assistant Examiner*—Yaritza Guadalupe
(74) *Attorney, Agent, or Firm*—Floyd E. Ivey; Liebler, Ivey, Connor, Berry & St. Hilaire

(57) ABSTRACT

An apparatus used with a range pole and survey instruments for leveling and setting elevations and a method of use of the apparatus. A frame holds a range pole, on an embed plate, without assistance of a surveyor's assistant while a surveyor communicates with an iron worker to effect elevation adjustments of the embed plate.

6 Claims, 5 Drawing Sheets

SELF-HOLDING AND SELF-LEVELING DEVICE FOR SURVEY RANGE POLE AND METHOD OF USE

FIELD OF THE INVENTION

This invention relates to an apparatus used with a range pole and survey instruments for leveling and setting elevations. The invention more particularly addresses a device which enables the leveling of and establishing a predetermined elevation, relative to a benchmark elevation, of embed plates or embeded plates employed in construction for instrument and equipment mooring.

BACKGROUND OF THE INVENTION

Setting elevations via survey equipment, including survey range poles, and leveling embed plates is known in the prior art. Included are U.S. Pat. No. 6,023,326 to Katayama et al; U.S. Pat. No. 6,002,473 to West; U.S. Pat. No. 5,983,511 to Osaragi et al; U.S. Pat. No. 5,760,748 to Beckingham; U.S. Pat. No. 6,067,046 to Nichols; U.S. Pat. No. 5,631,732 to Schrum; U.S. Pat. No. 5,619,802 to Rando et al; U.S. Pat. No. 5,541,727 to Rando et al; U.S. Pat. No. 4,366,940 to Vargas; U.S. Pat. No. 6,345,794 to Varner; U.S. Pat. No. 4,803,784 to Miller and U.S. Pat. No. 4,290,207 to Browning et al. The patents referred to herein are provided herewith in an Information Disclosure Statement in accordance with 37 CFR 1.97.

SUMMARY OF THE INVENTION

Embed plates, for the support of instruments and equipment, are commonly found in the construction of manufacturing and processing facilities. Prior to the pouring of concrete embed plates must be set at the intended elevation and must be level. The self-holding and self-leveling device for survey range pole and the method of use of this invention enables the setting of the elevation and the leveling of embed plates. The device provides a frame to support a range pole within a gimbal thereby eliminating the need for management of the range pole by a survey assistant thus allowing the person at the embed plate to make the adjustments to the embed plate elevation via adjustment of the embed plate elevation bolts. The device is moved from position to position on the embed plate embed plate with elevation adjustments made until the indicated elevation and plate leveling is accomplished. Provided is a range pole point target and level detection means to assist in elevation and level adjustments to the embed plate.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein.

DETAILED DESCRIPTION

Figure 1:
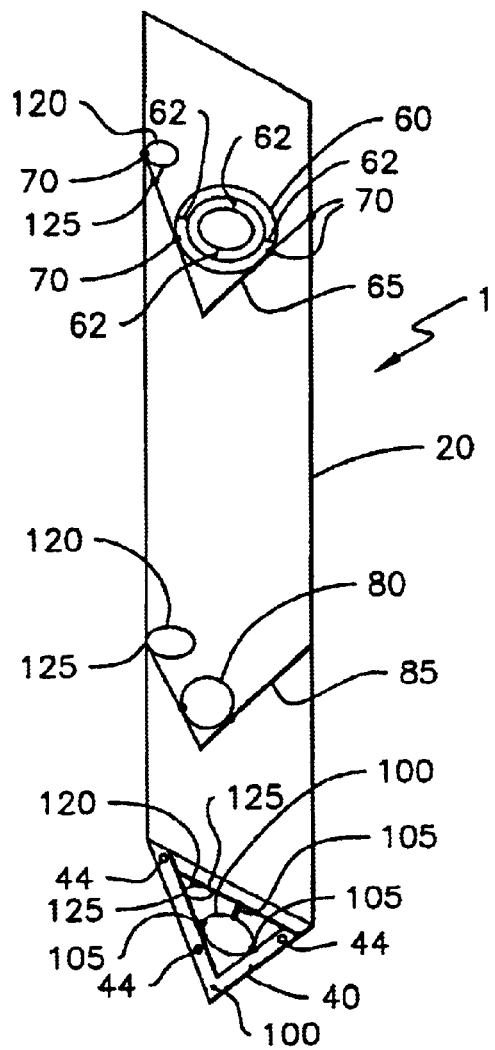
FIG. 1 illustrates a self-holding and self-leveling device (1) demonstrating a upper frame (20) and lower frame (40), gimbal (60), range pole steadying means (80), pole point target (100) and level detection means (120).
Figure 2:
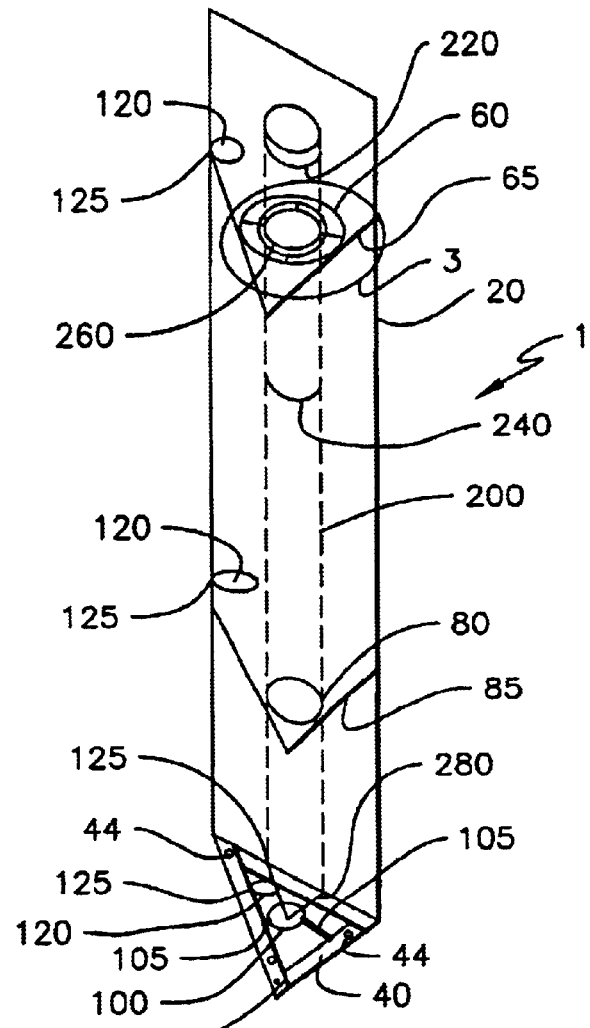
FIG. 2 illustrates the self-holding and self-leveling device (1) and additionally shows in phantom a range pole (200) illustrating a range pole upper transit line (220), a range pole lower transit line (240), a range pole gimbal stop means (260) and a range pole point means (280).
Figure 2A:
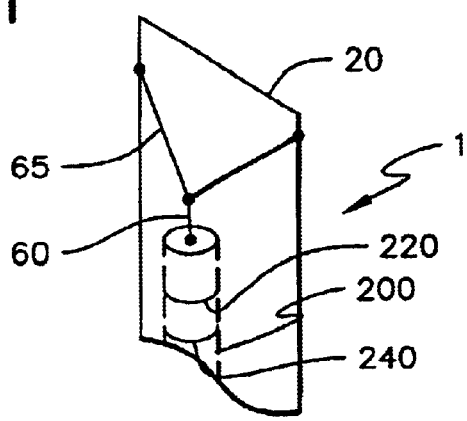
FIG. 2A illustrates a range pole suspension means (60) formed from a filament, wire or rod.
Figure 3:
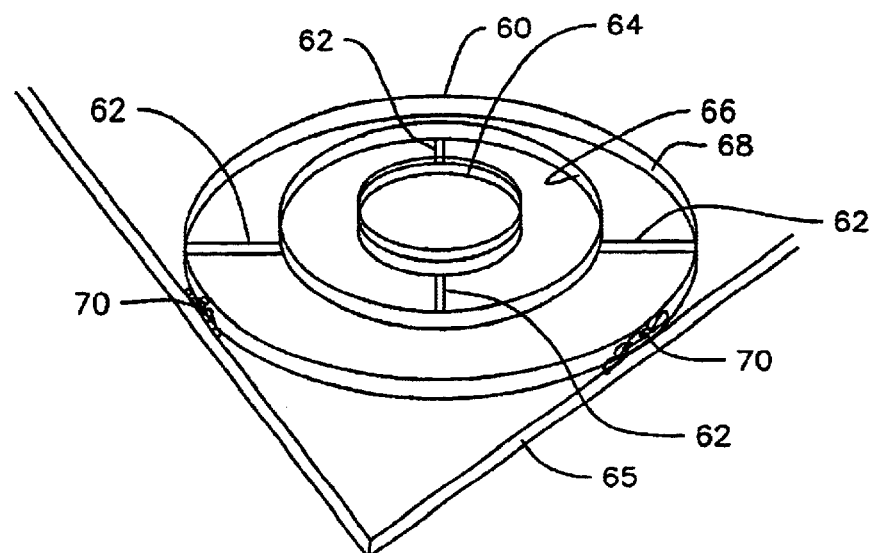
FIG. 3, a detail from FIG. 2, shows the gimbal (60) with gimbal bearing means (62), an inner gimbal axis (64), middle gimbal axis (66), outer gimbal axis (68), gimbal frame (65) and gimbal fixing means (70).

A self-holding and self-leveling device (1) as shown in FIGS. 1, 2, 2A, 3 and 5 illustrates an upper frame (20) which is upwardly standing from and rigidly affixed to, by frame affixing means, a substantially planar lower frame (40). A range pole suspension means (60) supported by a range pole suspension means frame (65) is affixed by affixing means to the upper frame (20).

The upper frame (20) and lower frame are composed of a tubular, rod, sheet or plate materials. The lower frame (40) is orthogonal to the upper frame (20). The apparatus of this invention, including the upper frame (20) and lower frame (40), are formed from rigid materials including metals, plastics and other rigid materials. At least one lower frame aperture (44) is formed in the lower frame (40) for interconnection with an embed plate (310).

One embodiment of the range pole suspension means (60) is a downwardly extending filament, wire or rod affixed by filament, wire or rod affixing means at a range pole suspension means frame (65). In the preferred embodiment the range pole suspension means (60) is a gimbal (60) supported by and affixed by gimbal frame affixing means (70) to a gimbal frame means (65).

The range pole suspension means frame (65) is orthogonal to and extending outwardly from the upper frame (20) coincidental in alignment with the lower frame (40) which is outwardly extending from the upper frame (20). The range pole suspension frame means (65) is formed from rigid tubular or rod materials, generally metals or rigid plastics, and filament, wire or rod affixing means or gimbal frame affixing means (70) includes welding, epoxies and other permanent affixing means suitable for bonding frame members.

A pole steadying means (80) is supported by a pole steadying frame (85) positioned intermediate the range pole suspension frame means (65) and the lower frame (40) affixed by frame affixing means to and extending orthogonally from the upper frame (20); the pole steadying means (80) is sized and shaped to loosely receive a survey range pole (200) such that the survey range pole (200) will be limited in its movement but will be sufficiently free to move and alert a surveyor when the range pole is other than vertical. The pole steadying means (80) may be composed of a ring or any other shape which encompasses a range pole.

A level detection means (120), comprising a level bubble or other level detection means, is positioned on the upper frame (20) or lower frame (40); level detection attachment means (125) positioned to affix level detection means (120). Where the range pole suspension means (60) is a gimbal, the gimbal (60) may be a 2-axis or 3-axis gimbal (60) presenting gimbal bearing (62) interrelated inner gimbal axis (64), middle gimbal axis (66) and outer gimbal axis (68) for a 3-axis gimbal (60) and for a 2-axis gimbal an inner gimbal axis (64) and a middle gimbal axis (66).

Figure 4:
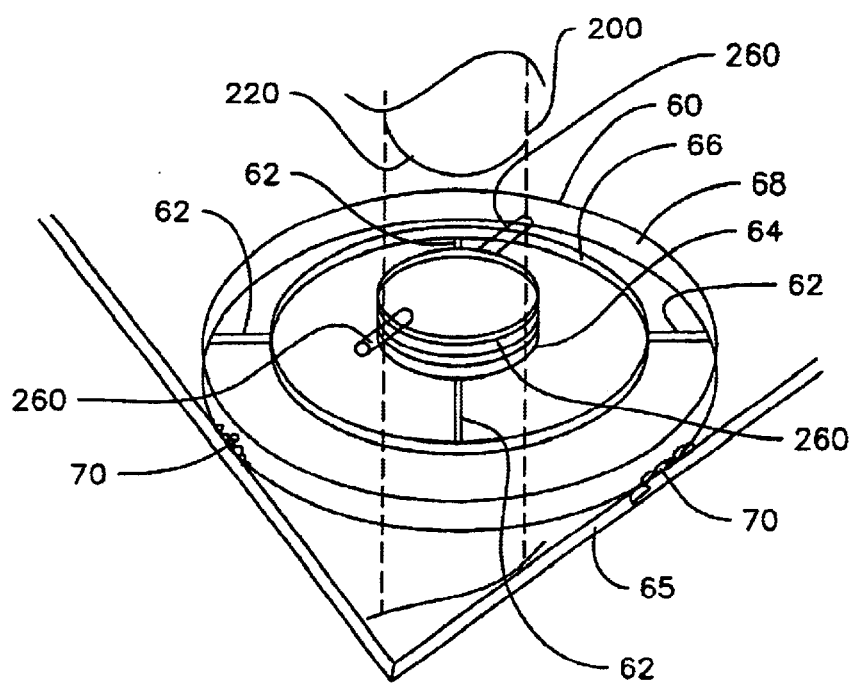
FIG. 4 illustrates the gimbal of FIG. 3 and additionally illustrates a range pole (200) in phantom and a range pole gimbal stop means (260).
Figure 5:
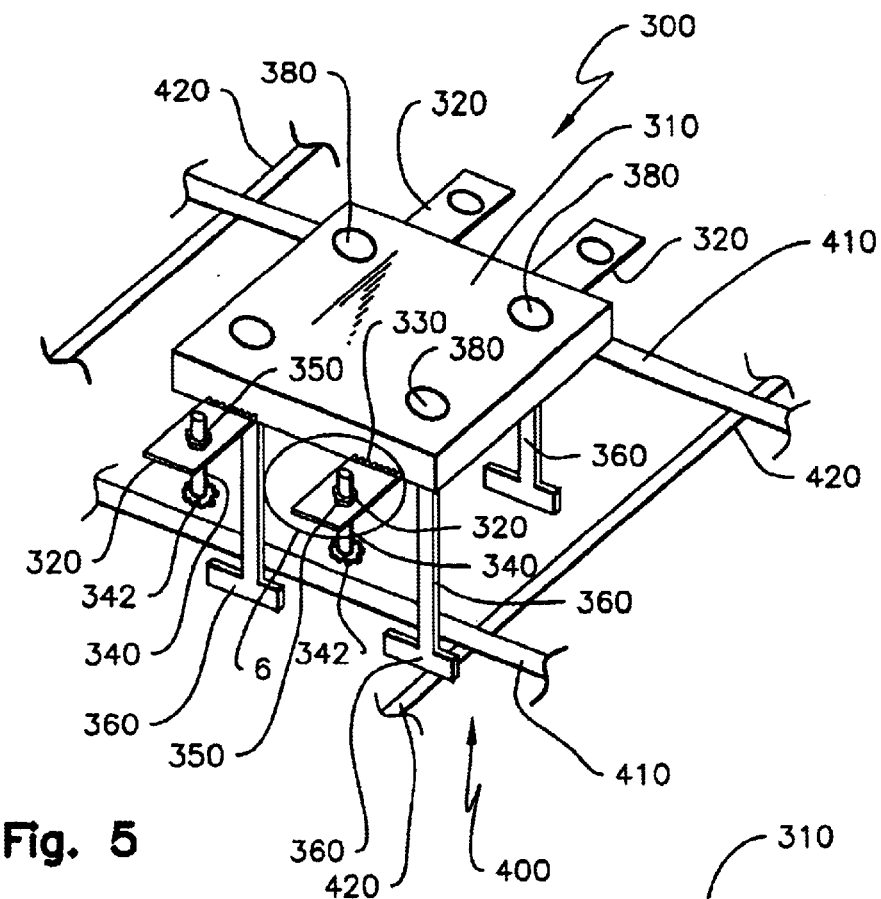
FIG. 5 shows an embed plate system (300) with embed plate (310), embed plate clip (320), embed plate clip fixing means (330), embed plate elevation bolt (340), embed plate elevation bolt fixing means (342), embed plate elevation nut (350), embed plate stud (360) and embed plate aperture (380). Also seen is a frame means (400) with a frame first member (410) and a frame second member (420).
Figure 6:
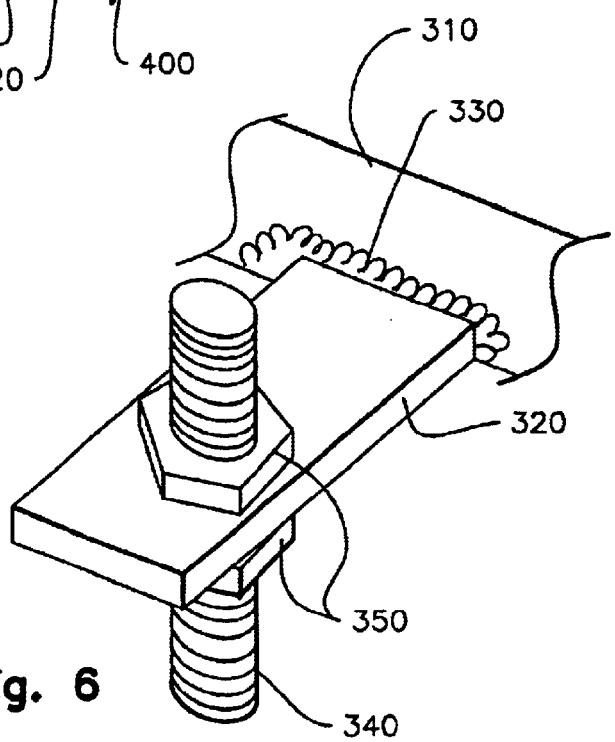
FIG. 6 is a detail from FIG. 5 showing the embed plate clip (320), embed plate elevation bolt (340), embed plate elevation bolt fixing means (342) and embed plate elevation nut (350).
Figure 7:
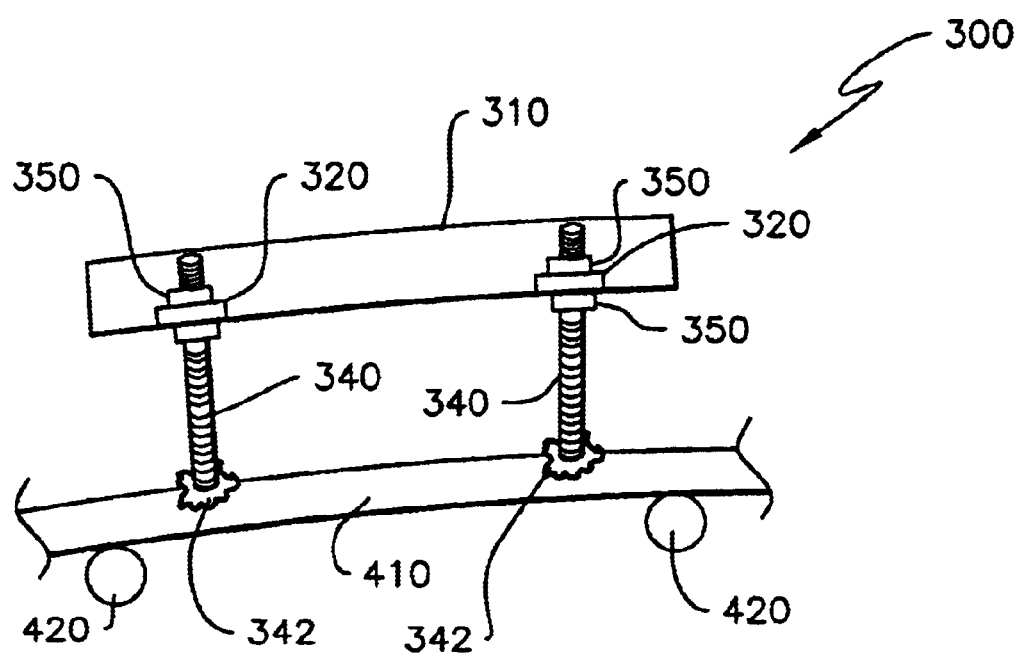
FIG. 7 is an elevation of the embed plate system (300) further illustrating the embed plate elevation bolt (340) and embed plate elevation nut (350) relative to the embed plate clip (320).

A range pole (200) utilized with this invention is a standard range pole (200) having a range pole upper transit line (220), a range pole lower transit line (240) and a range pole point means (280) distal to the upper transit line (220); the range pole lower transit line (240) is intermediate the range pole upper transit line (220) and the range pole point means (280). Where the range pole suspension means is a gimbal, the inner gimbal axis (64) is sized to receive the range pole (200); a range pole stop means (260), comprised in the preferred embodiment, of a ring sized to be received by the range pole (200) and to be fixed in place relative to the range pole by friction or an elastic function of the range pole gimbal stop means (260). The range pole stop means (260), in an alternative embodiment, is comprised of at least two tubes or pegs received orthogonally into and outwardly extending from the range pole. Where the range pole stop means (260) is comprised of at least two tubes or pegs, said pegs will be equidistantly placed around the range pole (200) at a common circumference as represented in FIG. 4.

The range pole stop means (260), where formed as a ring is generally formed of an elastic material but may be formed of a rigid material. The range pole stop means (260), when received by the range pole (200), will present an outer dimension or outer diameter greater than an inner dimension or inner diameter of the inner gimbal axis (64) such that the range pole stop means (260) will rest on the inner gimbal axis (64) and thus support the range pole (200) relative to the upper frame (20). The range pole gimbal stop means (260) is positioned intermediate the upper transit line (220) and the lower transit line (240).

The range pole suspension means (60) is positioned relative to the upper frame (20) and lower frame (40) to allow alignment of the range pole (200) and range pole point means (280) with a pole point target (100) when the invention (1) is positioned to place the range pole (200) vertical or when an embed plate (310) is level. The pole point target (100) maybe a scribe mark or indentation in the lower frame (40) or a cross-hair or bulls eye; where the pole point target (100) is other than a scribe mark or indentation in the lower frame (40) the pole point target (100) will be secured by pole point target fixing means (105) forming a frame; range pole point means (280) may be provided by a "point", a laser or other commonly used point means.

Where the range pole suspension means (60) is a filament, wire or rod, interconnection means will be provided by eye-hook or other filament, wire or rod affixing means between the filament, wire or rod at the range pole most distal to the pole point.

An embed plate system (300), is illustrated in FIGS. 5, 6, 7 and 8. Seen is an embed plate (310) upon which instruments and equipment will be moored or placed. Attached to and extending outwardly from the embed plate (310) is at least one embed plate clip (320) affixed to the embed plate (310) by embed plate clip fixing means (330) including welding, epoxies and other means generally determined by the material forming the embed plate (310). In the manufacturing or processing plant the embed plate will likely be formed from plate steel with other materials, generally for embed plates (310) including plastics, metals and other rigid materials. The embed plate clip (320) receives by aperture means an embed plate elevation bolt (340) which, combined with embed plate elevation nuts (350) comprises an embed plate elevation bolt fixing means (342) enabling the elevation adjustment of the embed plate (310). The embed plate system (300) may be secured at the construction site by affixing means between the at least one embed plate elevation bolt (340) to construction frame means (400) depicted in FIG. 8 as rebar and constituted as frame first member (410) and frame second member (420). The at least one embed plate elevation bolt (340) will generally be affixed by welding means to a frame first member (410).

Figure 8:
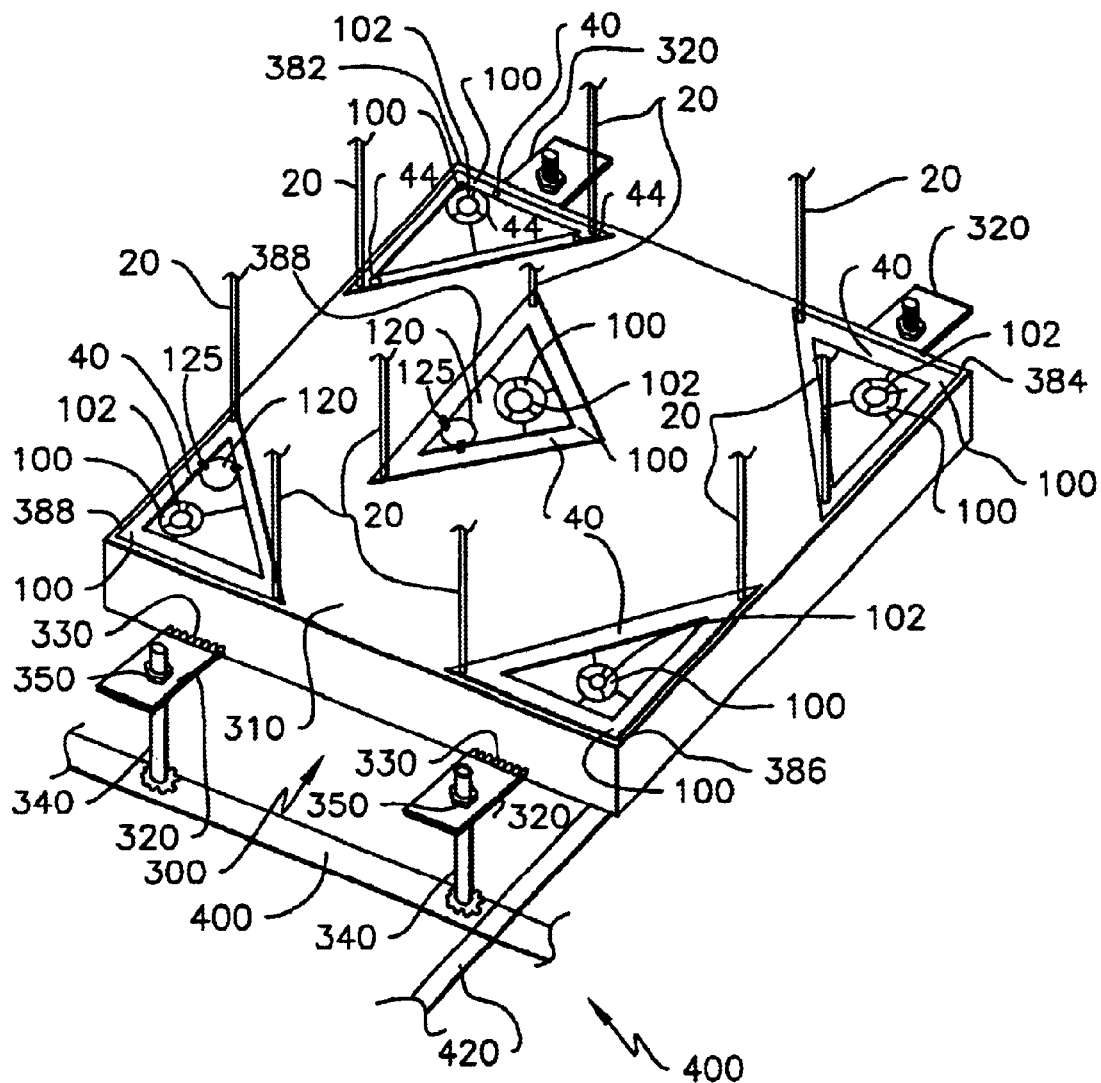
FIG. 8 illustrates the placing of the self-holding and self-leveling device (1) as employed in the setting of the elevation and leveling of an embed plate (310).

At least one embed plate stud (360) will extend in to the area to be encased in concrete. At least one embed plate aperture (380) will generally be formed in the embed plate (310) for use in securing instruments or equipment and which may be used to anchor the self-holding and self-leveling device (1) when placed for embed plate (310) elevation adjustment and leveling. Illustrated at FIG. 8 is embed plate position 1 (382), embed plate position 2 (384), embed plate position 3 (386) and embed plate position n (388) which constitute positions on an embed plate (310) for placement of the self-holding and self-leveling device (1) during the surveying process of embed plate (310) elevation adjustment and leveling.

A method of using a self-holding and self-leveling device (1) comprises placing the lower frame (40) on an embed plate (310) having at least one embed plate clip (320) extending outwardly from the embed plate (310). An aperture in the embed plate clip (320) receives an embed plate elevation bolt (340) and embed plate elevation nut (350) combination which permits elevation adjustments of the embed plate (310). A survey instrument is positioned at a benchmark. Then, positioning the self-holding and self-leveling device (1) such that the lower frame (40) is in contact with the embed plate (310) first at an embed plate position 1 (384), which is one corner of the rectangular embed plate (310) and, communicating between a surveyor and an iron worker at the embed plate (310), whereby the iron worker adjusting the embed plate elevation bolt (340) and embed plate elevation nut (350) combination, proximal to the embed plate position 1 (382), and hence moving the embed plate (310) nearer to the predetermined elevation. Next, moving the self-holding and self-leveling device (1) to an embed plate position 2 (384), the next corner of the rectangular embed plate (310) in either a clockwise or counter-clockwise progression; communicating between the surveyor and the iron worker whereby the iron worker adjusting the embed plate elevation bolt (340) and embed plate elevation nut (350) combination, proximal to the embed plate position 2 (384) and hence moving the embed plate (310) nearer to the predetermined elevation. Then next moving the self-holding and self-leveling device (1) to an embed plate position 3 (386); communicating from the surveyor and adjusting by the iron worker of the proximal embed plate elevation bolt (340) and embed plate elevation nut (350) combination, thereby moving the embed plate (310) nearer to the predetermined elevation. Repositioning the self-holding and self-leveling device (1) to an embed plate position n (388); communicating by a surveyor and adjusting by an iron worker of the proximal embed plate elevation bolt (340) and embed plate elevation nut (350) combination thereby moving the embed plate (310) nearer the predetermined elevation. Optionally concluding with a final repositioning of the self-holding and self-leveling device (1) to return the self-holding and self-leveling device (1) to embed plate position 1 (382) for a confirming elevation measurement.

The iron worker may, by referring to the range pole point means (280) and pole point target (100) and the level detection means (120), further assist in concluding the elevation position adjustments.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A self-holding and self-leveling device (1) comprising:
   a. an upper frame (20) which is upwardly standing from and rigidly affixed to, by frame affixing means, a substantially planar lower frame (40);
   b. a range pole suspension means (60) supported by a range polo suspension means frame (65) is affixed by affixing means to the upper frame (20);
   c. the upper framed (20) and lower frame are composed of a tubular, rod, sheet or plate materials;
   d. the lower frame (40) is orthogonal to the upper frame (20);
   e. the upper frame (20) and lower frame (40) are formed from rigid materials including metals, plastics and other rigid materials;
   f. at least one lower frame aperture (44) formed in the lower frame (40);
   g. range pole suspension means (60) is a downwardly extending filament, wire or rod affixed by filament, wire or rod affixing means at a range pole suspension means frame (65) or a gimbal (60) supported by and affixed by gimbal frame affixing means (70) to a gimbal frame means (65);
   h. the range pole suspension means frame (65) is orthogonal to and extending outwardly from the upper frame (20) coincidental in alignment with the lower frame (40) which is outwardly extending from the upper frame (20).

2. A self-holding and self-leveling device (1) of claim 1 further comprising:
   a. the range pole suspension frame means (65) is formed from rigid tubular or rod materials, generally metals or rigid plastics, and filament, wire or rod affixing means or gimbal frame affixing means (70) includes welding, epoxies and other permanent affixing means suitable for bonding frame members.

3. A self-holding and self-leveling (1) of claim 2 further comprising:
   a. a pole steadying means (80) is supported by a pole steadying frame (85) positioned intermediate the range pole suspension frame means (65) and the lower frame (40) affixed by frame affixing means to and extending orthogonally from the upper frame (20); the pole steadying means (80) is sized and shaped to loosely receive a survey range pole (200) such that the survey range pole (200) will be limited in its movement.

4. A self-holding and self-leveling device (1) of claim 3 further comprising:
   a. level detection means (120), comprising a level bubble or other level detection means, is positioned on the upper frame (20) or lower frame (40); level detection attachment means (125) positioned to affix level detection means (120);
   b. the role steadying means (80) is a ring.

5. A self-holding and self-leveling device (1) of claim 4 further comprising:
   a. where the range pole suspension means (60) is a gimbal, the gimbal (60) may be a 2-axis or 3-axis gimbal (60) presenting gimbal bearing (62) interrelated inner gimbal axis (64), middle gimbal axis (66) and outer gimbal axis (68) for a 3-axis gimbal (60) and for a 2-axis gimbal a inner gimbal axis (64) and a middle gimbal axis (66);
   b. a range pole (200) utilized with this invention is a standard range pole (200) having a range pole upper transit line (220), a range pole lower transit line (240) and a range pole point means (280) distal to the upper transit line (220); the range pole lower transit line (240) is intermediate the range pole upper transit line (220) and the range pole point means (280);
   c. the inner gimbal axis (64) is sized to receive the range pole (200); a range pole gimbal stop means (260), comprised of a ring sized to be received by the range pole (200) and to be fixed in place by friction or an elastic function of the range pole gimbal stop means (260) or of at least two tubes orthogonal to and outwardly extending from the range pole;
   d. the range pole gimbal stop means (260), where formed as a ring is generally formed of an elastic material but may be formed of a rigid material; the range pole gimbal stop means (260), when received by the range pole (200), will present an outer dimension or outer diameter greater than an inner dimension or inner diameter of the inner gimbal axis (64) such that the range pole gimbal stop means (260) will rest on the intermediate gimbal axis (64) and thus support the range pole (200) relative to the upper frame (20);
   e. the range pole gimbal stop means (260) is positioned intermediate the upper transit line (220) and the lower transit line (240);
   f. the range pole suspension means (60) is positioned relative to the upper frame (20) and lower frame (40) to allow alignment of the range pole (200) and range pole point means (280) with a pole point target (100) when the invention (1) is positioned to place the range pole (200) vertical or when an embed plate (310) is level;
   g. the pole point target (100) may be a scribe mark or indentation in the lower frame (40) or a cross-hair or bulls eye; where the pole point target (100) is other than a scribe mark or indentation in the lower frame (40) the pole point target (100) will be secured by pole point target fixing means (105) forming a frame; range pole point means (280) may be provided by a "point", a laser or other commonly used point means;
   h. where the range pole suspension means (60) is a filament, wire or rod, interconnection means between the filament, wire or rod at the range pole most distal to the pole point.

6. A method of using a self-holding and self-leveling device (1) comprising:

a. forming an upper frame (20) which is upwardly standing from and rigidly affixed to, by frame affixing means, a substantially planar lower frame (40);

b. affixing a range pole suspension means (60), supported by a range pole suspension means frame (65), by affixing means to the upper frame (20);

c. placing the lower frame (40) on an embed plate (310) having at least one embed pate clip (320) extending outwardly from the embed plate (310); an aperture in the embed plate chip (320) receiving an embed plate elevation bolt (340) and embed plate elevation nut (350) combination which permits elevation adjustments of the embed plate (310);

d. positioning a survey instrument at a benchmark;

e. positioning the self-holding and self-leveling device (1) such that the lower frame (40) is in contact with the embed plate (310); positioning the self-holding and self-leveling device (1) first at an embed plate position 1 (384), which is one corner of the rectangular embed plate (310) and, communicating between a surveyor and an iron worker at the embed plate (310), whereby the iron worker adjusting the embed plate elevation bolt (340) and embed plate elevation nut (350) combination, proximal to the embed plate position 1 (382), and hence moving the embed plate (310) nearer to the predetermined elevation;

f. moving the self-holding and self-leveling device (1) to an embed plate position 2 (384), the next corner of the rectangular embed plate (310) in either a clockwise or counter-clockwise progression; communicating between the surveyor and the iron worker whereby the iron worker adjusting the embed plate elevation bolt (340) and embed plate elevation nut (350) combination, proximal to the embed plate position 2 (384) and hence moving the embed plate (310) nearer to the predetermined elevation;

g. moving the self-holding and self-leveling device (1) to an embed plate position 3 (386); communicating from the surveyor and adjusting by the iron worker of the proximal embed plate elevation bolt (340) and embed plate elevation nut (350) combination, thereby moving the embed plate (310) nearer to the predetermined elevation;

h. repositioning the self-holding and self-leveling device (1) to an embed plate position n (388); communicating by a surveyor and adjusting by an iron worker of the proximal embed plate elevation bolt (340) and embed plate elevation nut (350) combination thereby moving the embed plate (310) nearer the predetermined elevation;

i. optionally concluding with a final repositioning of the self-holding and self-leveling device (1) to return the self-holding and self-leveling device (1) to embed plate position 1 (382) for a confirming elevation measurement;

j. the iron worker may, by referring to the range pole point means (280) and pole point target (100) and the level detection means (120), further assist in concluding the elevation position adjustments.

* * * * *